United States Patent
Kim

(10) Patent No.: US 7,342,627 B2
(45) Date of Patent: Mar. 11, 2008

(54) LIQUID CRYSTAL DISPLAY DEVICE USING OCB MODE AND CHOLESTERIC LIQUID CRYSTAL COLOR FILTER AND FABRICATING METHOD THEREOF

(75) Inventor: Gi-Hong Kim, Annyang-si (KR)

(73) Assignee: LG.Philips LCD. Co., Ltd., Seoul (KR)

(*) Notice: Subject to any disclaimer, the term of this patent is extended or adjusted under 35 U.S.C. 154(b) by 0 days.

(21) Appl. No.: 11/410,152

(22) Filed: Apr. 25, 2006

(65) Prior Publication Data
US 2006/0187382 A1 Aug. 24, 2006

Related U.S. Application Data

(62) Division of application No. 10/691,602, filed on Oct. 24, 2003, now Pat. No. 7,057,688.

(30) Foreign Application Priority Data
Oct. 31, 2002 (KR) ............... 2002-67119

(51) Int. Cl.
*G02F 1/1335* (2006.01)
(52) U.S. Cl. ............ 349/115; 349/106
(58) Field of Classification Search ........ 349/115
See application file for complete search history.

(56) References Cited

U.S. PATENT DOCUMENTS

| | | | | |
|---|---|---|---|---|
| 5,325,218 A | * | 6/1994 | Willett et al. | 349/74 |
| 5,825,445 A | * | 10/1998 | Okamoto et al. | 349/118 |
| 6,222,605 B1 | * | 4/2001 | Tillin et al. | 349/167 |
| 6,512,569 B1 | * | 1/2003 | Acosta et al. | 349/181 |
| 6,636,291 B2 | * | 10/2003 | Van De Witte et al. | 349/187 |
| 6,727,967 B2 | * | 4/2004 | Nakamura et al. | 349/114 |
| 2004/0021809 A1 | * | 2/2004 | Sumiyoshi et al. | 349/113 |

* cited by examiner

*Primary Examiner*—Andrew Schechter
(74) *Attorney, Agent, or Firm*—McKenna, Long & Aldridge LLP

(57) ABSTRACT

A liquid crystal display device includes first and second substrates having inner surfaces facing and spaced apart from each other; a light absorption layer on an inner surface of the first substrate; a cholesteric liquid crystal color filter (CCF) layer on the light absorption layer for selectively reflecting light corresponding to one of red, green, and blue colors; a first transparent electrode on the CCF layer; a first orientation film on the first transparent electrode; a second transparent electrode on the inner surface of the second substrate; a second orientation film on the second transparent electrode, the first and second orientation films being rubbed along the same direction; a polarizing plate on an outer surface of the second substrate; and a layer of liquid crystal material between the first and second orientation films, wherein the layer of liquid crystal material has a bend structure.

14 Claims, 12 Drawing Sheets

LIQUID CRYSTAL DISPLAY DEVICE USING OCB MODE AND CHOLESTERIC LIQUID CRYSTAL COLOR FILTER AND FABRICATING METHOD THEREOF

This application is a Divisional of prior application Ser. No. 10/691,602, filed Oct. 24, 2003, now U.S. Pat. No. 7,057,688.

This application claims the benefit of Korean Patent Applications No. 2002-67119, filed on Oct. 31, 2002, which is hereby incorporated by reference for all purposes as if fully set forth herein.

BACKGROUND OF THE INVENTION

1. Field of the Invention

The present invention relates to liquid crystal display (LCD) devices, and more particularly to an LCD device incorporating a cholesteric liquid crystal color filter (CCF) layer.

2. Discussion of the Related Art

Due to their light weight, thin profile, and low power consumption characteristics, LCD devices are currently being developed as next generation display devices. Generally, LCD devices are non-emissive type display devices capable of displaying images by exploiting anisotropic optical refractive index difference properties of liquid crystal material interposed between a thin film transistor (TFT) array substrate and a color filter (C/F) substrate. Among the various types of commonly used LCD devices, active matrix LCD (AM-LCD) devices are capable of displaying images at high resolution and are excellent at displaying moving images.

Since LCD devices are non-emissive, one type of LCD device, the transmissive LCD device, displays images using light emitted from an external light source (e.g., a backlight unit). The efficiency with which transmissive LCD devices transmit the light emitted from backlight units, however, is relatively low. For example, only about 7% of the light emitted from backlight units is actually transmitted by transmissive LCD devices. Therefore, backlight units of transmissive LCD must emit light at a relatively high intensity (brightness). Consequently, backlight units account for a relatively large percentage of all power consumed by transmissive LCD devices. Further, large capacity batteries must typically be used to supply a sufficient amount of power to the backlight unit. However, even when large capacity batteries are used, the operating times of transmissive LCD devices become limited.

To solve the aforementioned problems related to transmissive LCD devices, reflective LCD devices have been developed that do not require backlight units but, rather, use ambient light as a light source. A first type of reflective LCD device includes absorption type color filter layers and a reflective layer. A second type of reflective LCD device includes cholesteric liquid crystal color filter (CCF) layer for selectively reflecting and transmitting light. Accordingly, the CCF layer in the second type of reflective LCD device functions both as a color filter layer and as a reflective layer and enables the second type of reflective LCD device to display images having high color purity. Moreover, since a separate reflective layer is not necessary, processes used to fabricate the second type of reflective LCD devices are simplified compared to the first type of reflective LCD device.

Liquid crystal molecules within liquid crystal material exhibiting a nematic liquid crystal phase are regularly aligned along one direction. CCF layers are formed from multiple layers of cholesteric liquid crystal (CLC) material exhibiting the nematic liquid crystal phase wherein a rotation of liquid crystal molecules, and therefore reflectance characteristics, between the multiple layers of CLC material is different. The difference in reflectance characteristics allow colors to be selectively displayed by reflection and interference of the light. The rotation of liquid crystal molecules within CLC material generates a helical structure that may be defined by a direction of the molecular rotation and a pitch (e.g., the distance between liquid crystal molecules having the same alignment, measured along the axis of rotation) of liquid crystal molecules within the CLC material. The pitch of the CLC material is variable and determines the wavelength of light the CLC material reflects. The central wavelength of light reflected by the CLC material, $\lambda_c$, can be expressed as the product of the pitch, p, of the CLC material and the average refractive index, $n_{avg}$, of the CLC material (i.e., $\lambda_c = n_{avg} \cdot p$). For example, if a pitch, p, of the CLC material is about 430 nm and an average refractive index of the CLC material is about 1.5, the central wavelength of the reflected light is about 650 nm and corresponds to the color red. CLC material capable of reflecting green and blue light can similarly be provided by forming CLC material to have the corresponding pitch.

FIG. 1 illustrates a cross-sectional view of a related art reflective liquid crystal display device incorporating a cholesteric liquid crystal color filter layer.

Referring to FIG. 1, first substrate 10 includes an inner surface that faces and is spaced apart from an inner surface of a second substrate 50. A light absorption layer 12 is formed on the inner surface of the first substrate 10 and a cholesteric liquid crystal color filter (CCF) layer 14 is formed on the light absorption layer 12 for selectively reflecting light having predetermined wavelength range. The light absorption layer 12 absorbs light of all wavelengths except for the light selectively reflected by the CCF layer 14. A first transparent electrode 16 is formed on the CCF layer 14 and a first orientation film 18 is formed on the first transparent electrode 16. An array element layer 52 is formed on the inner surface of the second substrate 50 and a second transparent electrode 54 is formed on the array element layer 52. A second orientation film 56 is formed on the second transparent electrode 54. A layer of liquid crystal material 70 is interposed between the first and second orientation films 18 and 56. A retardation film 60 is formed on an outer surface of the second substrate 50 and a polarizing plate 62 is formed on the retardation film 60.

Generally, a broadband quarter wave plate (QWP) having a retardation value of $\lambda/4$ or $3\lambda/4$ is used as the retardation film 60 and changes a polarization state of light. For example, the broadband QWP converts circularly polarized light into linearly polarized light, and vice-versa.

Although not shown in FIG. 1, the array element layer 52 generally includes a plurality of gate lines, a plurality of data lines crossing the plurality of gate lines, and thin film transistors connected to respective ones of the gate and data lines at crossings of the gate and data lines. Pixel regions are defined by crossings of the gate and data lines.

FIG. 2A schematically illustrates optical driving principles of a related art reflective LCD device incorporating a CCF layer in the absence of a voltage applied to a layer of liquid crystal material. FIG. 2B schematically illustrates optical driving principles of a related art reflective LCD device incorporating a CCF layer in the presence of a voltage applied to a layer of liquid crystal material.

For convenience of illustration, the related art reflective LCD device shown in FIGS. 2A and 2B functions in a normally black mode (i.e., a black image is displayed in the absence of an applied voltage). Further, for convenience of illustration, only a red sub pixel region is shown in FIGS. 2A and 2B.

Referring to FIGS. 2A and 2B, the polarizing plate 62 is provided as a linear polarizer having a polarization axis of 0° and the retardation film 60 is provided as a broadband quarter wave plate (QWP) capable of altering the phase of incident light by +45° and the phase of reflected light by −45°. In the absence of an applied voltage, the layer of liquid crystal material 70 has a first retardation value of $\lambda/2$ and, in the presence of an applied voltage, the layer of liquid crystal material 70 has a second retardation value of 0. The layer of liquid crystal material 70, first orientation film 18, and second orientation film 56 (from FIG. 1) constitute a parallel cell and rubbing directions of the first and second orientation films 18 and 56 cross each other at an angle of 180°. The CCF layer 14 selectively reflects only left-handed circularly polarized light having a wavelength corresponding to the color red.

Referring now to FIG. 2A, non-polarized ambient light incident to the polarizing plate 62 becomes linearly polarized light in correspondence with the polarization axis of the polarizing plate 62. Thus, linearly polarized light having a polarizing angle of 0° is transmitted by the polarizing plate 62 and is subsequently converted into left-handed circularly polarized light by the retardation film 60. Since the layer of liquid crystal material 70 has the first retardation value of $\lambda/2$ in the absence of an applied voltage (i.e., V=0; off state), the left-handed circularly polarized light transmitted by the retardation film is converted into right-handed circularly polarized light by the layer of liquid crystal material 70. Further, since the CCF layer 14 selectively reflects only left-handed circularly polarized light having a wavelength range corresponding to the color red, the right-handed circularly polarized light is transmitted by the CCF layer 14 and is absorbed by the light absorption layer 12. Accordingly, the reflective LCD device is maintained in a black state.

Referring now to FIG. 2B, non-polarized ambient light incident to the polarizing plate 62 becomes linearly polarized light in correspondence with the polarization axis of the polarizing plate 62. Thus, linearly polarized light having a polarizing angle of 0°, transmitted by the polarizing plate 62, is subsequently converted into left-handed circularly polarized light by the retardation film 60. Since the layer of liquid crystal material 70 has the second retardation value of 0 in the presence of the applied voltage of (i.e., V=V$_0$, wherein V$_0$ is the turn-on voltage of the layer of liquid crystal material 70), the left-handed circularly polarized light transmitted by the retardation film is not converted by the layer of liquid crystal material 70. Further, since the CCF layer 14 selectively reflects only left-handed circularly polarized light having a wavelength range corresponding to the color red, red left-handed circularly polarized light transmitted by the layer of liquid crystal material 70 is reflected by the CCF layer 14. The reflected red left-handed circularly polarized light is then transmitted by the layer of liquid crystal material 70 and is subsequently converted into red linearly polarized light having a polarizing angle of 0° by the retardation film 60. As the red linearly polarized light transmitted by the retardation film 60 has the polarizing angle of 0°, the red linearly polarized light is transmitted by the polarizing plate 62 having the polarizing angle of 0°. The optical driving principles described above with respect to red light are similarly applicable to wavelength ranges of light corresponding to green and blue colors. Accordingly, the related art reflective LCD device maintains a white state by combining the reflected red, green, and blue light.

The related art reflective LCD device shown in FIGS. 1, 2A and 2B can also be fabricated as a transmissive LCD device incorporating the CCF layer. Accordingly, CCF layers capable of selectively reflecting wavelength ranges of light corresponding to green and blue colors are formed within the red sub pixel region such that only red light is transmitted by the CCF layers.

FIG. 3 illustrates a cross-sectional view of a related art transmissive LCD device incorporating a CCF layer.

Referring to FIG. 3, first substrate 110 includes an inner surface that faces and is spaced apart from an inner surface of a second substrate 150. A cholesteric liquid crystal color filter (CCF) layer 112, including first and second sub-CCF layers 112a and 112b, respectively, is formed on the inner surface of the first substrate 110. A first transparent electrode 114 is formed on the CCF layer 112 and a first orientation film 116 is formed on the first transparent electrode 114. A first polarizing plate 120 is formed on an outer surface of the first substrate 110. An array element layer 152 is formed on an inner surface of the second substrate 150 and a second transparent electrode 154 is formed on the array element layer 152. A second orientation film 156 is formed on the second transparent electrode 154. A retardation film 160 is formed on an outer surface of the second substrate 150 and a second polarizing plate 162 is formed on the retardation film 160. The first polarizing plate 120 is formed of a cholesteric liquid crystal (CLC) material that selectively reflects left-handed or right-handed circularly polarized light of all wavelengths (e.g., light of all colors). The CCF layer 112 selectively reflects left-handed or right-handed circularly polarized light within a predetermined wavelength range (i.e., light of a predetermined color). Accordingly, the first polarizing plate 120 and the CCF layer 112 are typically made of different materials.

A layer of liquid crystal material 170 is interposed between the first and second orientation films 116 and 156. The layer of liquid crystal material 170, first orientation film 116, and second orientation film 156 constitute a parallel cell an rubbing directions of the first and second orientation films 116 and 156 cross each other at an angle of 180°. A backlight unit 180 is disposed beneath the first polarizing plate 120.

Although not shown in FIG. 3, the array element layer 152 generally includes a plurality of gate lines, a plurality of data lines crossing the gate lines, and thin film transistors connected to respective ones of the gate and data lines at crossings of the gate and data lines. Pixel regions are defined by crossings of the gate and data lines.

FIG. 4A schematically illustrates optical driving principles of a related art transmissive LCD device incorporating a CCF layer in the absence of a voltage applied to a layer of liquid crystal material. FIG. 4B schematically illustrates optical driving principles of a related art transmissive LCD device incorporating a CCF layer in the presence of a voltage applied to a layer of liquid crystal material.

For convenience of illustration, the related art transmissive LCD device of FIGS. 4A and 4B functions in a normally black mode (i.e., a black image is displayed in the absence of an applied voltage). Further, for convenience of illustration, only a red sub pixel region is shown in FIGS. 4A and 4B.

Referring to FIGS. 4A and 4B, the first polarizing plate 120 is formed of cholesteric liquid crystal (CLC) material that selectively reflects only right-handed circularly polarized light of all wavelengths (e.g., all colors). The second polarizing plate 162 is provided as a linear polarizer having a polarization axis of 0°. The retardation film 160 is provided as a broadband quarter wave plate (QWP) capable of altering the phase of incident light by +45° and the phase of reflected light by −45°. The cholesteric liquid crystal color filter (CCF) layer 112 includes first and second sub-CCF layers 112a and 112b that selectively reflect left-handed circularly polarized light having wavelengths within predetermined ranges corresponding to green and blue colors, respectively. In the absence of an applied voltage, the layer of liquid crystal material 170 has a first retardation value of λ/2 and, in the presence of an applied voltage, the layer of liquid crystal material 170 has a second retardation value of 0.

Referring now to FIG. 4A, of the non-polarized light emitted by the backlight unit 180 and incident to the first polarizing plate 120, right-handed circularly polarized light of all wavelengths is selectively reflected and only left-handed circularly polarized light of all wavelengths is transmitted by the first polarizing plate 120. The CCF layer 112, including the first and second sub CCF layers 112a and 112b, then selectively reflects only the incident left-handed circularly polarized light having wavelength ranges corresponding to green and blue colors. Accordingly, only left-handed circularly polarized light having a wavelength range corresponding to the color red is transmitted by the CCF layer 112. Since the layer of liquid crystal material 170 has the first retardation value of λ/2 in the absence of an applied voltage (i.e., V=0; off state), the left-handed circularly polarized light transmitted by the CCF layer 112 is converted into right-handed circularly polarized by the layer of liquid crystal material 170. The right-handed circularly polarized light is then converted into linearly polarized light having a polarizing angle of 90° via the retardation film 160. Since the second polarizing plate 162 is a linear polarizer having a polarization axis of 0°, the linearly polarized light having a polarizing angle of 90° does not pass through the second polarizing plate 162. Accordingly, the transmissive LCD device is maintained in a black state.

Referring now to FIG. 4B, of the non-polarized light emitted by the backlight unit 180 and incident to the first polarizing plate 120, right-handed circularly polarized light of all wavelengths is selectively reflected and only left-handed circularly polarized light of all wavelengths is transmitted by the first polarizing plate 120. The CCF layer 112, including the first and second sub CCF layers 112a and 112b, then selectively reflects only the incident left-handed circularly polarized light having wavelength ranges corresponding to green and blue colors. Accordingly, only left-handed circularly polarized light having a wavelength range corresponding to the color red is transmitted by the CCF layer 112. Since the layer of liquid crystal material 170 has the second retardation value of 0 in the presence of the applied voltage (i.e., V=V$_0$; on state), the left-handed circularly polarized light transmitted by the CCF layer 112 is also transmitted by the layer of liquid crystal material 170. The left-handed circularly polarized light is then converted into linearly polarized light having a polarizing angle of 0° via the retardation film 160. Since the second polarizing plate 162 is a linear polarizer having a polarization axis of 0°, the linearly polarized light having a polarizing angle of 0° is transmitted by the second polarizing plate 162. The optical driving principles described above with respect to red light are similarly applicable to wavelengths of light corresponding to green and blue colors. Accordingly, the related art transmissive LCD device maintains a white state by combining the transmitted red, green, and blue light.

As mentioned above, the related art LCD devices incorporating the CCF layer use retardation films formed from a broadband QWP to display images. The broadband QWP compensates phase differences for broadband wavelengths light (e.g., light of having wavelength ranges corresponding to red, green, and blue colors). Related art broadband QWPs generally are constructed of a multi-layer system including a conventional QWP and a half wave plate (HWP). Accordingly, relatively large fabrication costs are associated with broadband QWPs and the reliability of LCD devices including a broadband QWP becomes reduced due to shrinkage and distortion problems inherent to broadband QWPs.

SUMMARY OF THE INVENTION

Accordingly, the present invention is directed to a liquid crystal display device that substantially obviates one or more of problems due to limitations and disadvantages of the related art.

An advantage of the present invention provides a liquid crystal display device incorporating a cholesteric liquid crystal color filter (CCF) layer that does not incorporate a retardation film.

Another advantage of the present invention provides a liquid crystal display device incorporating a CCF layer that is fabricated with a low fabrication cost and a high production yield.

Yet another advantage of the present invention provides transmissive and reflective liquid crystal display devices incorporating CCF layers that do not include retardation films.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include first and second substrates each having inner surfaces facing and spaced apart from each other; a light absorption layer arranged on the inner surface of the first substrate; a cholesteric liquid crystal color filter (CCF) layer arranged on the light absorption layer, wherein the CCF layer selectively reflects light corresponding to a wavelength range of one of red, green, and blue light; a first transparent electrode arranged on the CCF layer; a first orientation film arranged on the first transparent electrode; a second transparent electrode arranged on the inner surface of the second substrate; a second orientation film arranged on the second transparent electrode, wherein the first and second orientation films are rubbed along the same direction; a polarizing plate may be arranged on an outer surface of the second substrate; and a layer of liquid crystal material arranged between the first and second orientation films, wherein the layer of liquid crystal material has a bend structure.

In another aspect of the present invention, a liquid crystal display device may, for example, include first and second substrates each having inner surfaces facing and spaced apart from each other; a first polarizing plate arranged on an outer surface of the first substrate; a cholesteric liquid crystal color filter (CCF) layer arranged on the inner surface of the first substrate, the CCF layer for selectively transmitting light corresponding to wavelengths of one of red, green, and blue light; a first transparent electrode arranged on the CCF layer; a first orientation film arranged on the first transparent electrode; a second transparent electrode arranged on the inner surface of the second substrate; a second orientation film arranged on the second transparent electrode, wherein the first and second orientation films are rubbed along one direction; a second polarizing plate arranged on an outer surface of the second substrate; a layer of liquid crystal material arranged between the first and second orientation films, wherein the layer of liquid crystal material has a bend structure; and a backlight unit arranged beneath the first polarizing plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Liquid crystal display (LCD) devices manipulate electro-optical characteristics of a layer of liquid crystal material to display images. Accordingly, voltages applied to the layer of liquid crystal material may be adjusted to control light transmittance characteristics of the layer of liquid crystal material. LCD devices may generally be classified into three types: current-effect type; electric field-effect type; and heat-effect type LCD devices.

Electric field-effect type LCD devices operate in one of a twisted nematic (TN) mode, a guest-host (GH) mode, an electrically controlled birefringence (ECB) mode, and a phase change mode. Within ECB mode LCD devices, a uniformly oriented layer of liquid crystal material is interposed between orthogonally aligned polarizers. Light transmittance characteristics of the layer of liquid crystal material may be altered according to a birefringence effect induced by applied voltages. Of the types ECB mode LCD devices, a substantially symmetric bend structure may be induced within liquid crystal (LC) molecules of optically compensated birefringence (OCB) mode LCD devices, wherein an angle defined between the long axis of LC molecules present midway between opposing substrates of an OCB mode LCD device and the long axis of LC molecules adjacent the substrates is substantially 90°, and wherein the angle between the long axes gradually decreases moving away from the midpoint, toward the substrates. Due to the substantially symmetric bend structure, OCB mode LCD devices generally have low response times.

Figure 5:
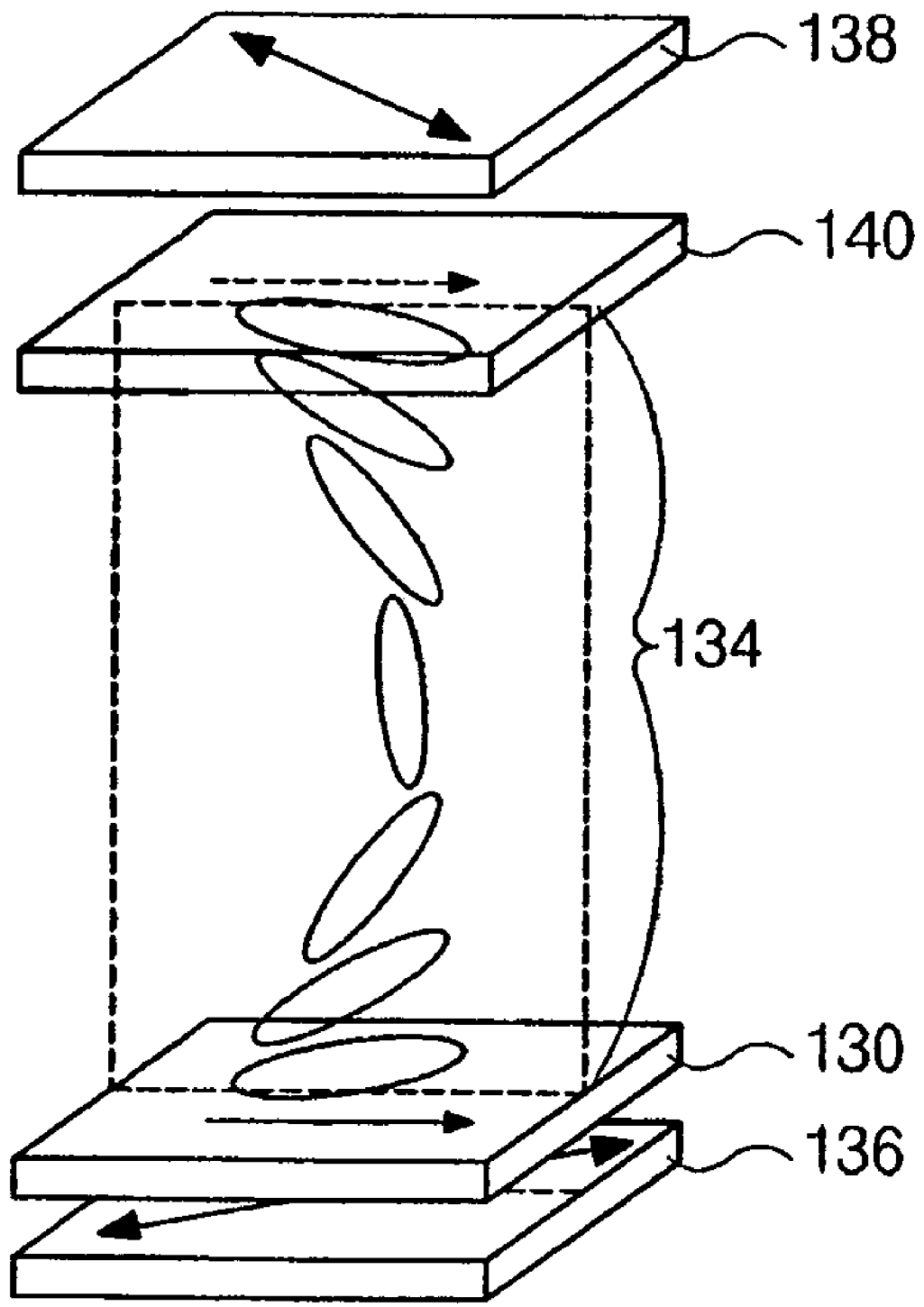
FIG. 5 illustrates an optically compensated birefringence mode liquid crystal display device according to the principles of the present invention.

FIG. 5 illustrates an OCB mode LCD device according to the principles of the present invention.

Referring to FIG. 5, first and second substrates 130 and 140, respectively, each include inner surfaces facing and spaced apart from each other. A layer of liquid crystal material 134 may be interposed between the first and second substrates 130 and 140. First and second polarizing plates 136 and 138, respectively, may be formed on outer surfaces of the first and second substrates 130 and 140, respectively. A first orientation film (not shown) may be formed between the inner surface of the first substrate 130 and the layer of liquid crystal material 134 while a second orientation film (not shown) may be formed between the inner surface of the second substrate 140 and the layer of liquid crystal material 134. In one aspect of the present invention, the alignment direction of the first and second orientation films may be substantially the same. In another aspect of the present invention, the first and second orientation films may be rubbed along the same direction. According to the principles of the present invention, the layer of liquid crystal material 134, the first orientation film, and the second orientation films constitute a bend cell having the aforementioned bend structure in the presence of an applied voltage greater than a threshold voltage of the layer of liquid crystal material 134.

In the presence of the applied voltage, liquid crystal molecules within the layer of liquid crystal material 134 may quickly rotate. In one aspect of the present invention, the time required to realign the liquid crystal molecules (i.e., response time) may be less than about 5 milliseconds. Accordingly, the OCB mode LCD device of the present invention may be provided with a response time sufficient to substantially eliminate residual images and therefore capable of displaying moving images. In another aspect of the present invention, while the OCB mode LCD device may have an adequate response time, a viewing angle may be relatively narrow. Thus, the viewing angle may be widened using a compensating film (not shown) provided as a biaxial film having a simpler structure than a retardation film and be fabricated according to a simpler process than that required to fabricate a retardation film. Further, the material cost of the compensating film may be substantially less than that of the retardation film. In one aspect of the present invention, the compensating film may be interposed between the outer surface of the second substrate 140 and the second polarizing plate 138. Accordingly, retardation films such as those incorporated within the aforementioned related art LCD devices are not required by the LCD device of the present invention.

According to the principles of the present invention, the layer of liquid crystal material 134 may be driven between a minimum voltage and a maximum voltage. In one aspect of the present invention, the maximum voltage may be greater than a threshold voltage of the layer of liquid crystal material. In one aspect of the present invention, the minimum voltage may be substantially equal to the threshold voltage of the layer of liquid crystal material required to induce the aforementioned bend structure. In another aspect of the present invention, the layer of liquid crystal material 134 may have a first retardation value of $3\lambda/4$ in the presence of the applied minimum voltage and a second retardation value of $\lambda/4$ in the presence of the applied maximum voltage.

Figure 6:
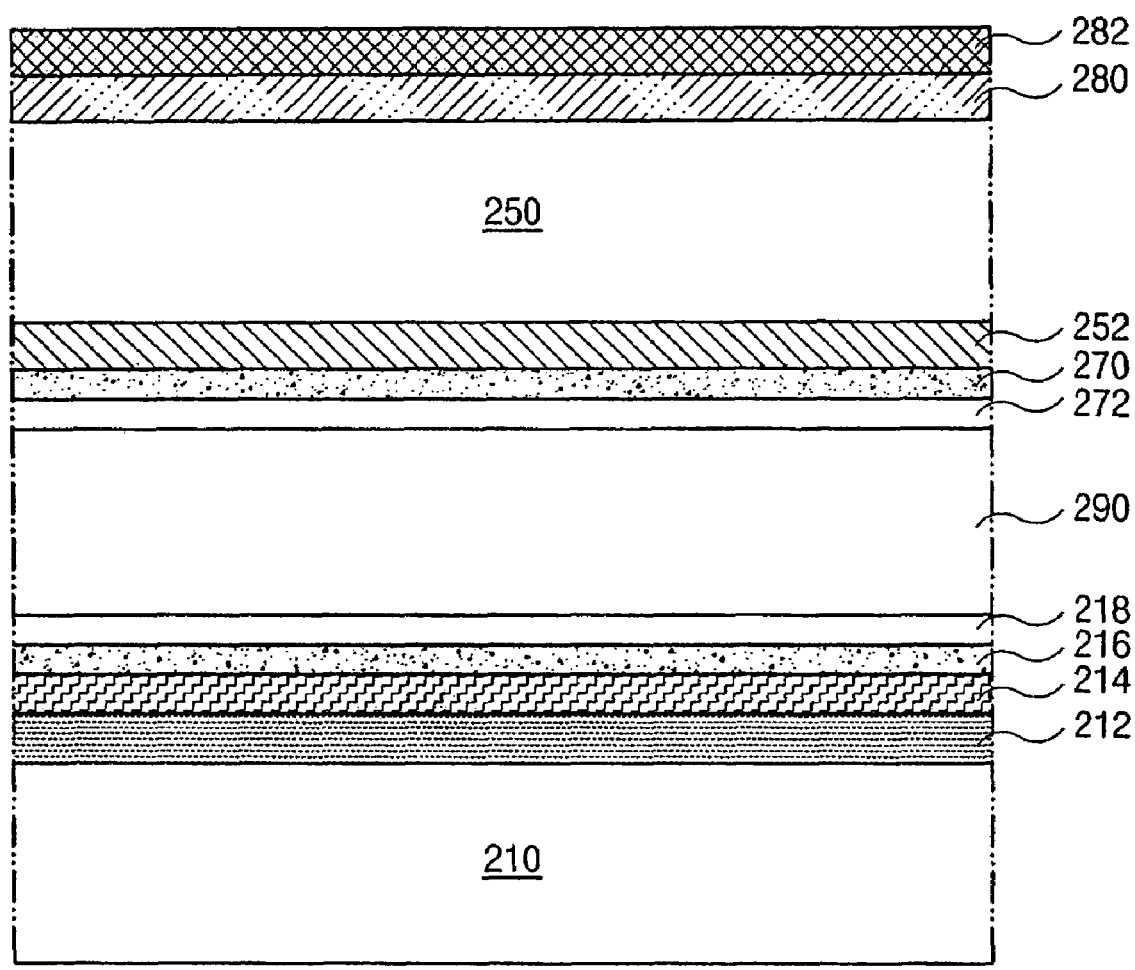
FIG. 6 illustrates a cross-sectional view of a reflective liquid crystal display device incorporating a CCF layer in accordance with a first aspect of the present invention.

FIG. 6 illustrates a cross-sectional view of a reflective liquid crystal display device incorporating a CCF layer in accordance with a first aspect of the present invention.

Referring to FIG. 6, first and second substrates 210 and 250, respectively, may each include inner surfaces facing and spaced apart from each other. A light absorption layer 212 may be formed on the inner surface of the first substrate 210 and a cholesteric liquid crystal color filter (CCF) layer 214 may be formed on the light absorption layer 212. The light absorption layer 212 may be formed of a black resin. The CCF layer 214 may selectively reflect light having a predetermined wavelength range. The light absorption layer 212 may absorb light of all wavelengths except for the light selectively reflected by the CCF layer 214. A first transparent electrode 216 may be formed on the CCF layer 214 and a first orientation film 218 may be formed on the first transparent electrode 216. An array element layer 252 may be formed on the inner surface of the second substrate 250 and a second transparent electrode 270 may be formed on the array element layer 252. A second orientation film 272 may be formed on the second transparent electrode 270. A compensating layer 280 may be formed on an outer surface of the second substrate 250 and a polarizing plate 282 may be formed on the compensating film 280. A layer of liquid crystal material 290 may be interposed between the first and second orientation films 218 and 272.

According to the principles of the present invention, the alignment direction of the first and second orientation films 218 and 272 may be substantially the same. In one aspect of the present invention, the first and second orientation films 218 and 272 may be rubbed along the same direction. The layer of liquid crystal material 290, the first orientation film 218, and the second orientation film 272 may constitute a bend cell having the aforementioned bend structure in the presence of an applied voltage that is greater than a threshold voltage of the layer of liquid crystal material 290. In another aspect of the present invention, the layer of liquid crystal material 290 may have a first retardation value of $3\lambda/4$ in the presence of the applied minimum voltage and a second retardation value of $\lambda/4$ in the presence of the applied maximum voltage. In one aspect of the present invention, the maximum voltage may be greater than a threshold voltage of the layer of liquid crystal material. In one aspect of the present invention, the minimum voltage may be substantially equal to the threshold voltage of the layer of liquid crystal material to induce the aforementioned bend structure.

Figure 1:
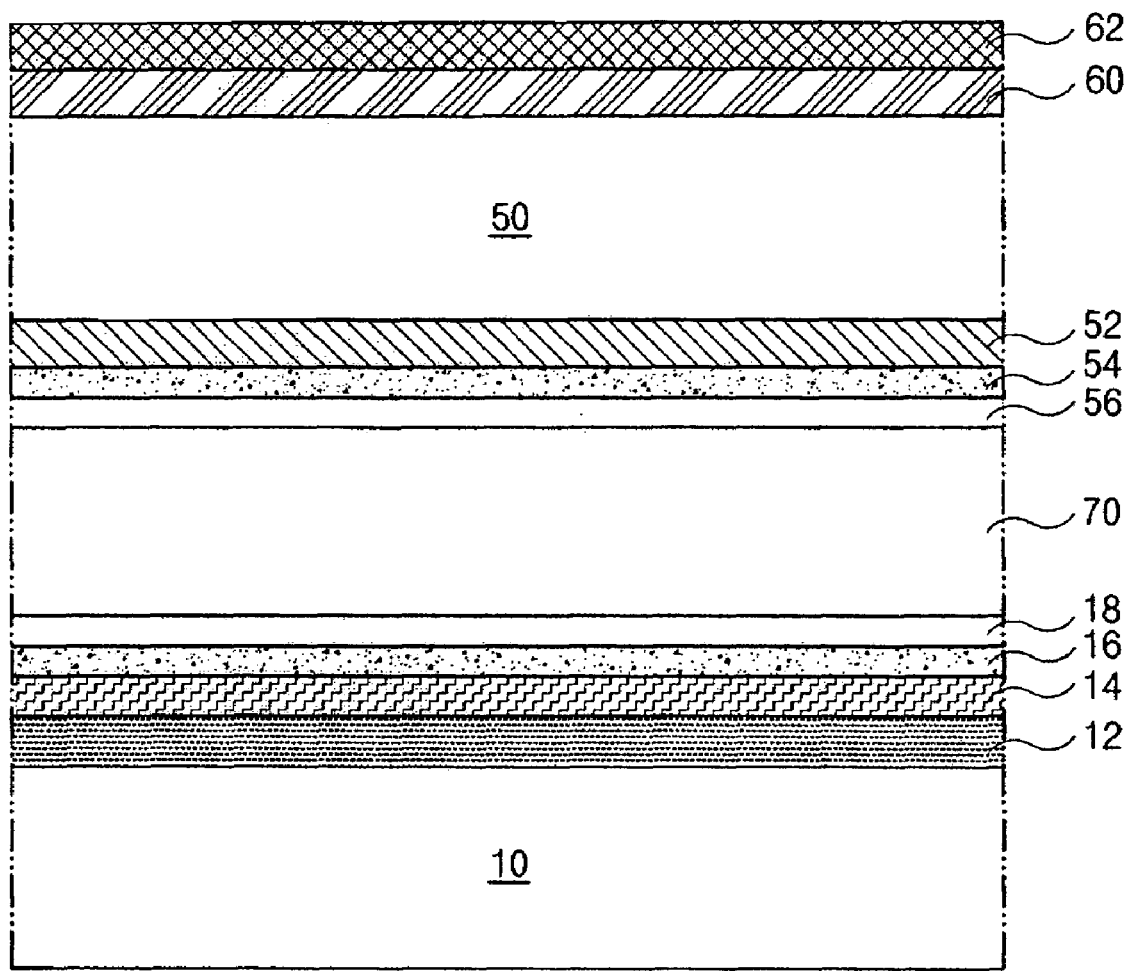
FIG. 1 illustrates a cross-sectional view of a related art reflective liquid crystal display device incorporating a cholesteric liquid crystal color filter (CCF) layer.
Figure 2A:
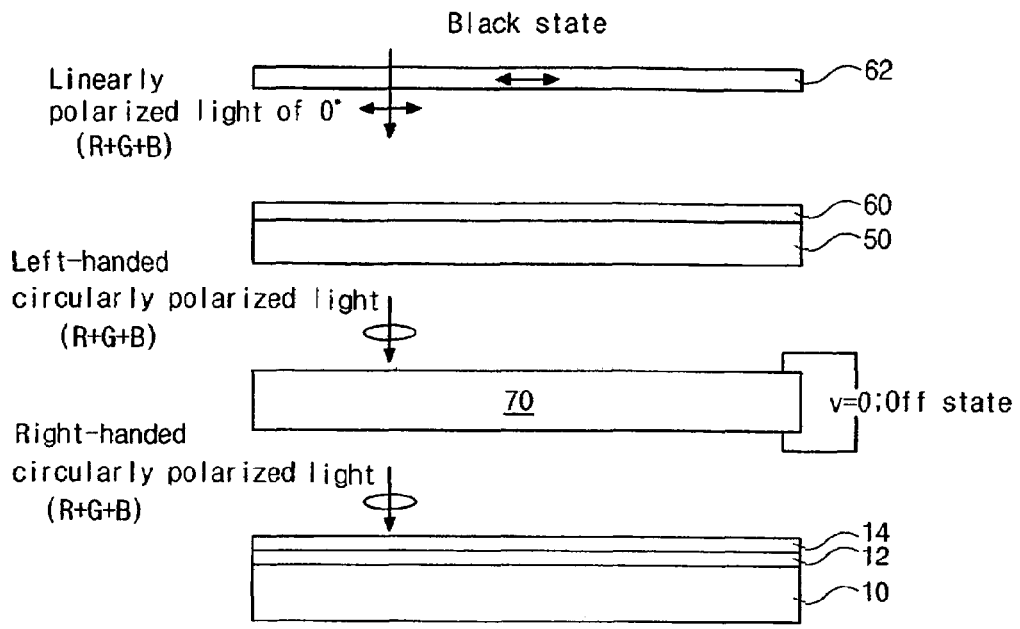
FIG. 2A schematically illustrates optical driving principles of a related art reflective LCD device incorporating a CCF layer in the absence of a voltage applied to a layer of liquid crystal material.
Figure 2B:
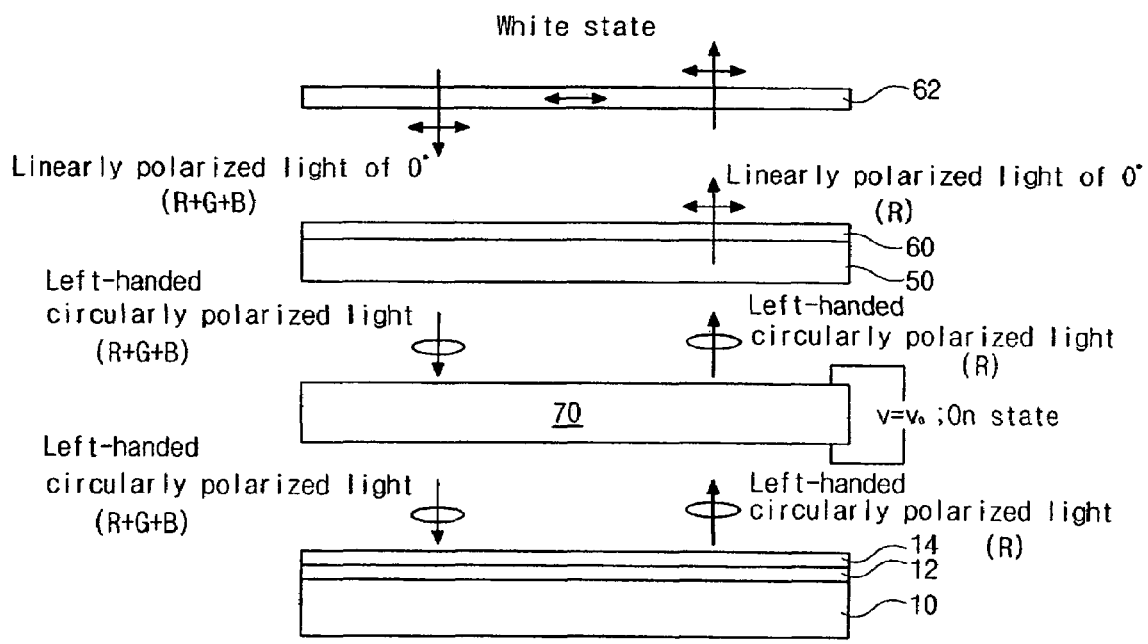
FIG. 2B schematically illustrates optical driving principles of a related art reflective LCD device incorporating a CCF layer in the presence of a voltage applied to a layer of liquid crystal material.
Figure 3:
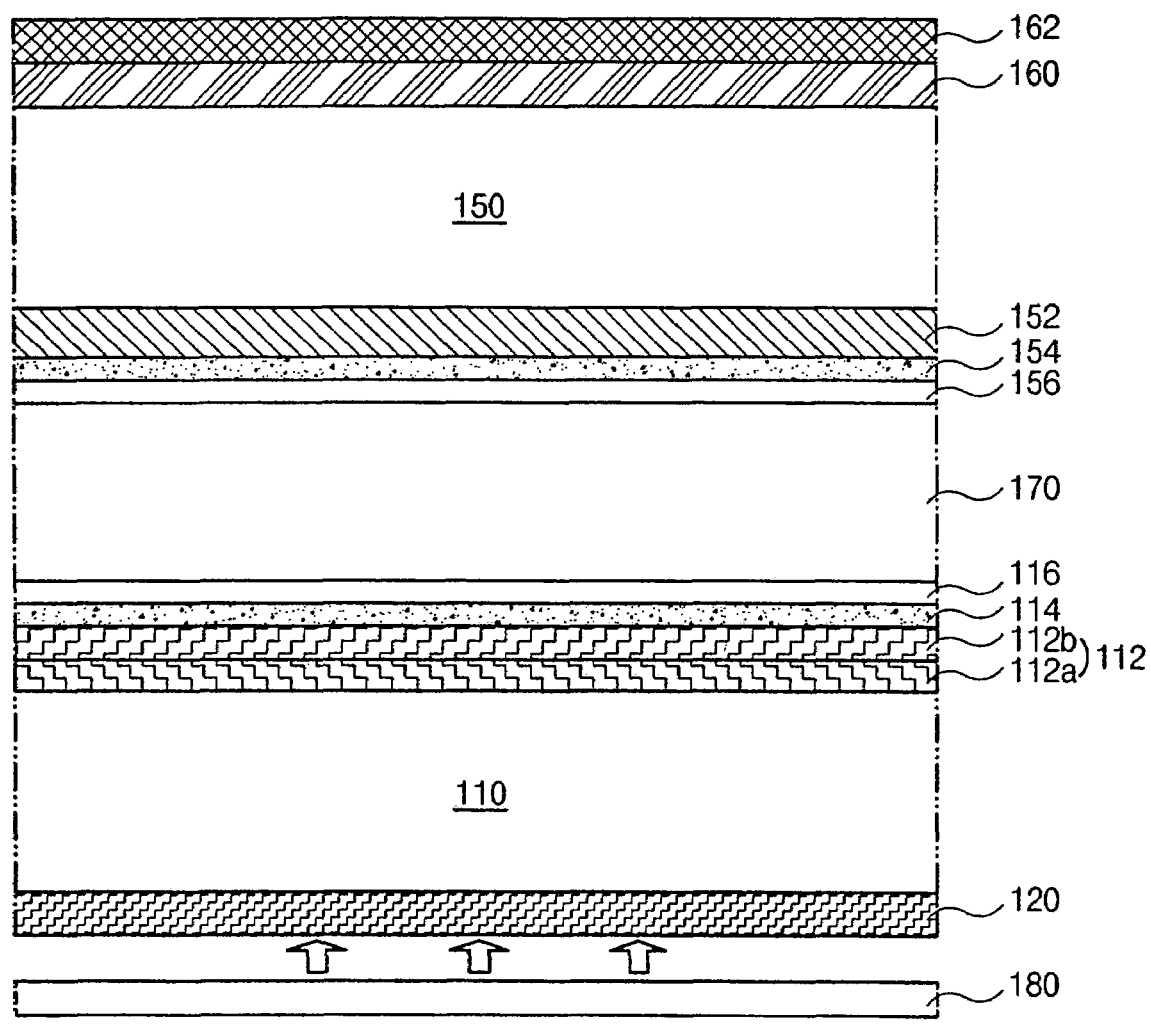
FIG. 3 illustrates a cross-sectional view of a related art transmissive LCD device incorporating a CCF layer.
Figure 4A:
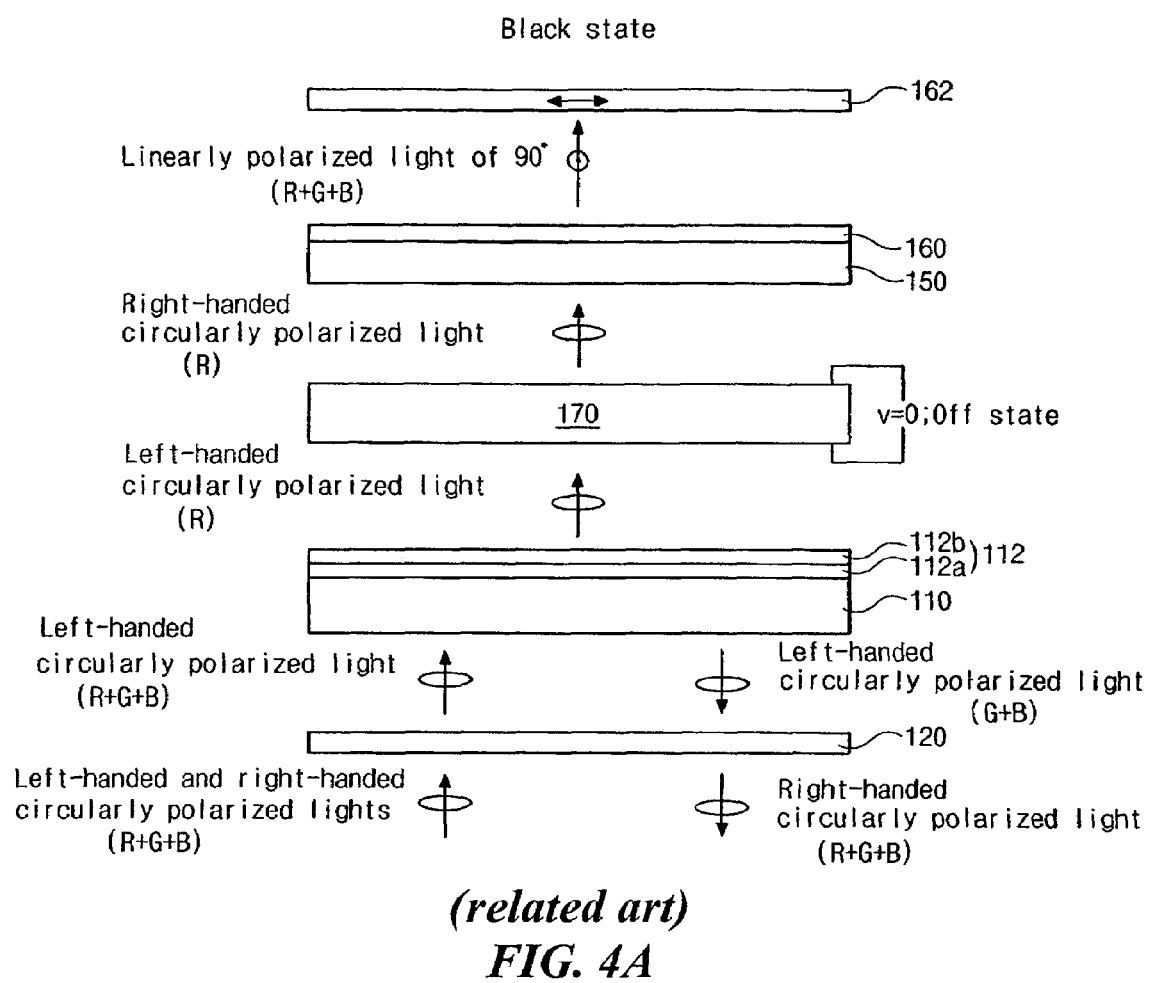
FIG. 4A schematically illustrates optical driving principles of a related art transmissive LCD device incorporating a CCF layer in the absence of a voltage applied to a layer of liquid crystal material.
Figure 4B:
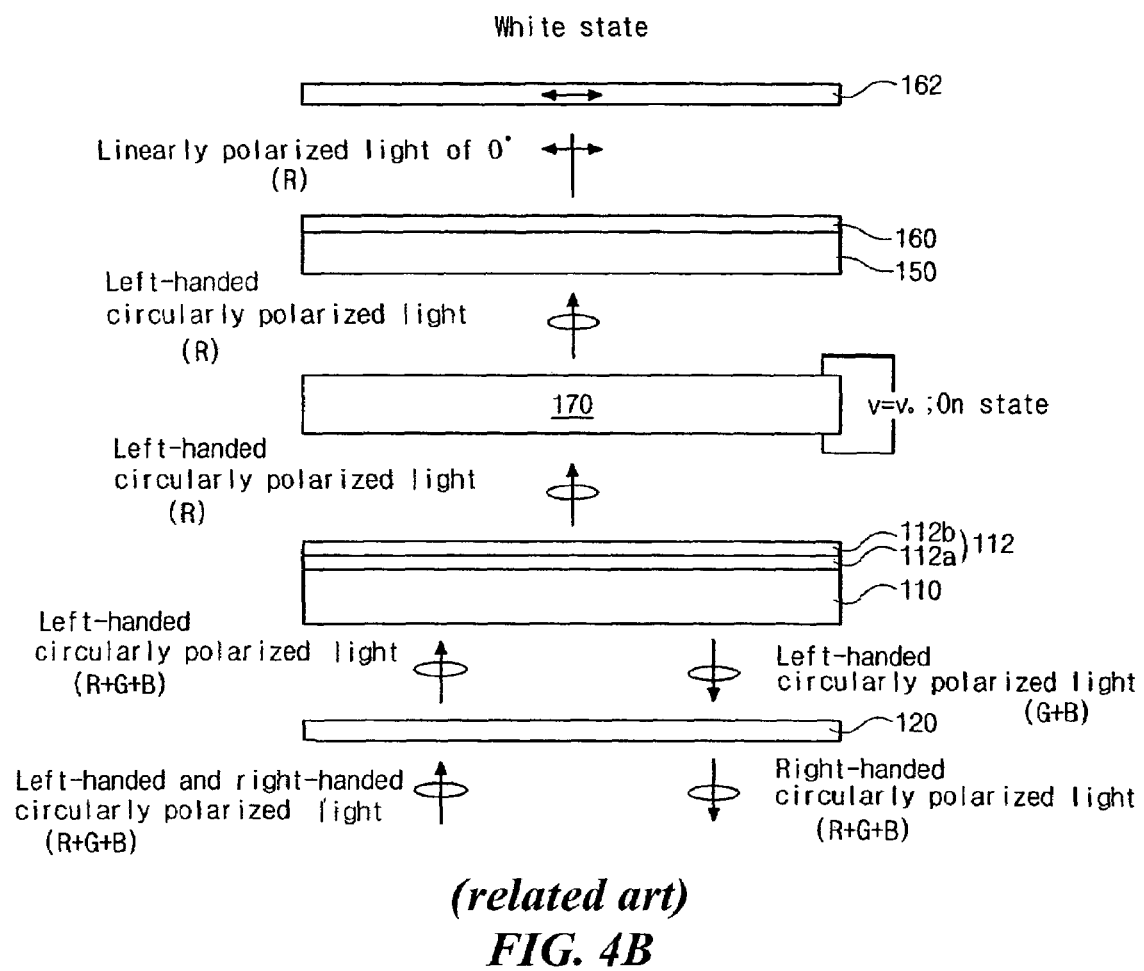
FIG. 4B schematically illustrates optical driving principles of a related art transmissive LCD device incorporating a CCF layer in the presence of a voltage applied to a layer of liquid crystal material.

The compensating layer 280 of the present invention differs from the retardation film 60 shown in FIG. 1 because the compensating layer 280 may be provided as a biaxial film having a simpler structure than the retardation film 60 shown in FIG. 1 and be fabricated according to a simpler process than that required to fabricate the retardation film 60. Further, the material cost of the compensating film may be substantially less than that of the retardation film. Accordingly, the compensating film may widen the viewing angle and improve the display quality of the LCD device shown in FIG. 6 whereas the retardation film 60 of FIG. 1 is provided as a broadband QWP that compensates a phase difference of incident light. Accordingly, retardation films such as those incorporated within the aforementioned related art LCD devices are not required by the LCD device of the present invention. In one aspect of the present invention, the compensating layer 280 may be omitted by adjusting a parameter of the bend cell structure.

Figure 7:
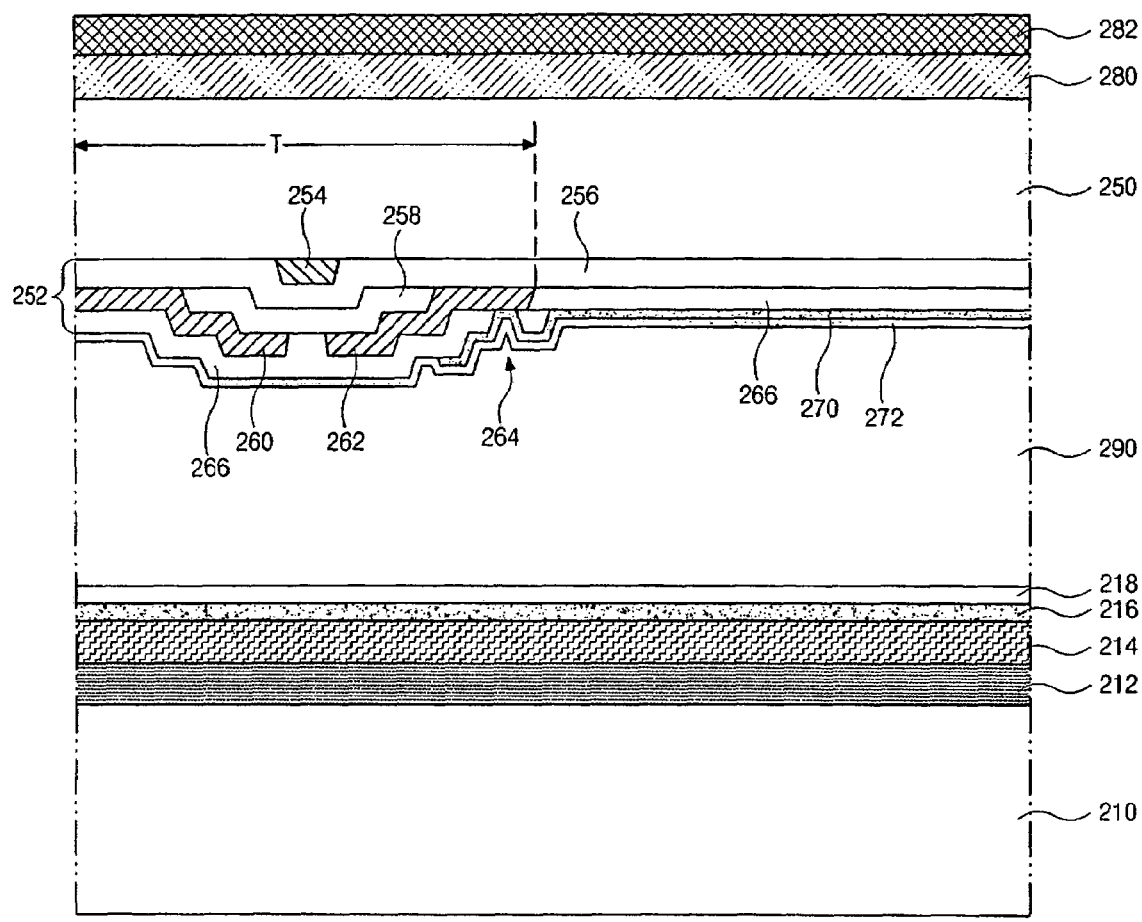
FIG. 7 illustrates a cross-sectional view of an array element layer within one sub-pixel region of a reflective liquid crystal display device incorporating a CCF layer in accordance with the first aspect of the present invention.

FIG. 7 illustrates a cross-sectional view of an array element layer within one sub-pixel region of a reflective liquid crystal display device incorporating a CCF layer in accordance with the principles of the present invention.

Referring to FIG. 7, first and second substrates 210 and 250, respectively, each include inner surfaces facing and spaced apart from each other. A light absorption layer 212, a CCF layer 214, a first transparent electrode 216, and a first orientation film 218 are sequentially formed on the inner surface of the first substrate 210. A gate electrode 254 may be formed on the inner surface of the second substrate 250 followed by the formation of a gate insulating layer 256 on the gate electrode 254. Next, a semiconductor layer 258 may be formed over the gate insulating layer 256 and the gate electrode 254 followed by the formation of source and drain electrodes 260 and 262, respectively, on the semiconductor layer 258. In one aspect of the present invention, the source and drain electrodes 260 and 262 may be spaced apart from each other by a predetermined distance. A passivation layer 266 may next be formed over the source and drain electrodes 260 and 262. Further, a drain contact hole 264 may be formed within the passivation layer 266 to expose the drain electrode 262. A second transparent electrode 270 may subsequently be formed over the passivation layer 266 and be electrically connected to the drain electrode 262 via the drain contact hole 264. Next, a second orientation film 272 may be formed over the second transparent electrode 270. Taken together, the gate electrode 254, the semiconductor layer 258, the source electrode 260, and drain electrode 262 constitute a thin film transistor (TFT) "T."

Although not shown in FIG. 7, a gate line and a data line, crossing the gate line, may be formed over the inner surface of the second substrate 250 to be connected to the gate electrode 254 and source electrode 260, respectively. Taken together, the gate and data lines and the TFT "T" constitute the array element layer 252. Upon applying a voltage to the first and second transparent electrodes 216 and 270, the layer of liquid crystal material 290 may be driven, wherein the first transparent electrode 216 acts as a common electrode and the second transparent electrode 270 acts as a pixel electrode.

Figure 8A:
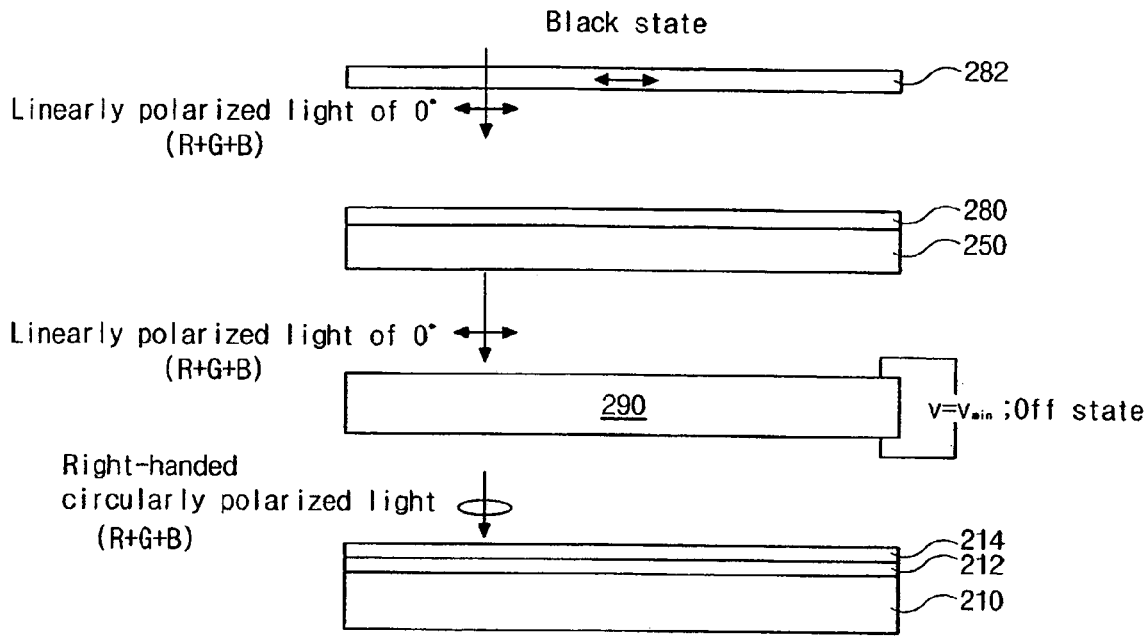
FIG. 8A schematically illustrates optical driving principles of a reflective liquid crystal display device shown in FIG. 6 in the presence of a minimum voltage applied to a layer of liquid crystal material.
Figure 8B:
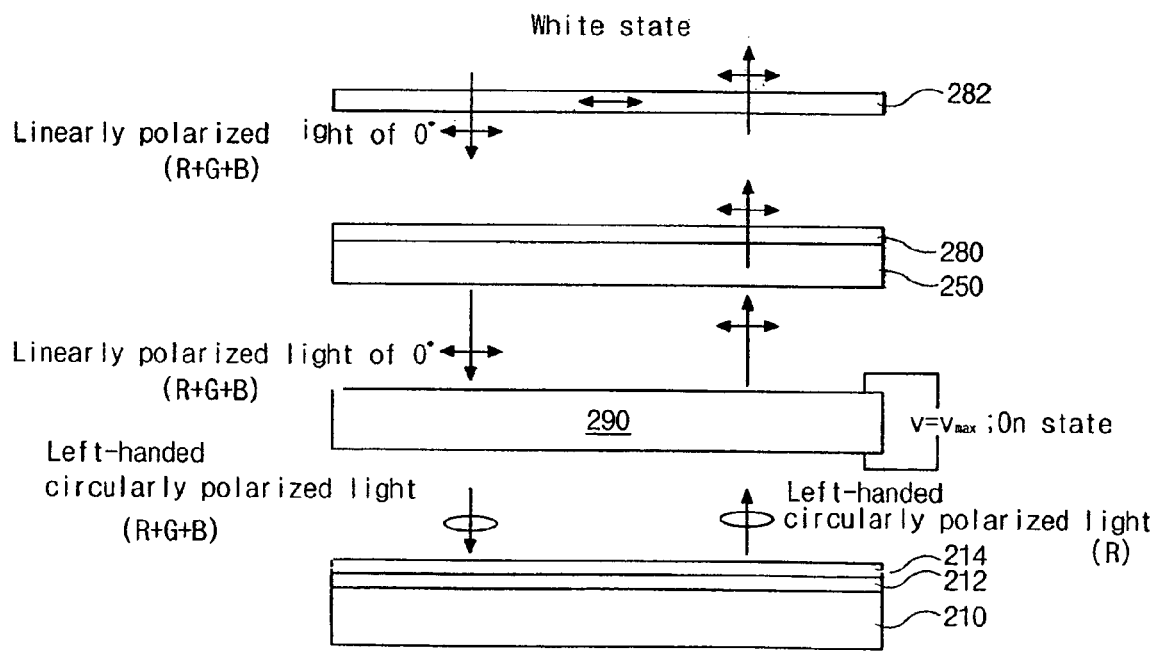
FIG. 8B schematically illustrates optical driving principles of a reflective liquid crystal display device shown in FIG. 6 in the presence of a maximum voltage applied to a layer of liquid crystal material.

FIG. 8A schematically illustrates optical driving principles of a reflective liquid crystal display device incorporating a CCF layer in the presence of a minimum voltage applied to a layer of liquid crystal material, and FIG. 8B schematically illustrates optical driving principles of a reflective liquid crystal display device incorporating a CCF layer in the presence of a maximum voltage applied to a layer of liquid crystal material.

For convenience of illustration, the reflective LCD device shown in FIGS. 8A and 8B may function in a normally black mode (i.e., a black image may be displayed in the presence of an applied minimum voltage). Further, for convenience of illustration, only a red sub-pixel region is shown in FIGS. 8A and 8B. It will be readily appreciated, however, that the optical driving principles described below may be similarly applied, for example, to green and blue sub-pixel regions as well.

Referring to FIGS. 8A and 8B, the polarizing plate 282 may be provided as a linear polarizer having a polarization axis of about 0°. The compensating layer 280 may be provided as a biaxial film for widening a viewing angle and improving a display quality of the reflective LCD device incorporating the cholesteric liquid crystal color filter (CCF) layer 214. The CCF layer 214 may selectively reflect only left-handed circularly polarized light having a wavelength range corresponding to the color red. The layer of liquid crystal material 290 may be provided to exhibit a bend structure in the presence of an applied voltage greater than a threshold voltage. In one aspect of the present invention, the layer of liquid crystal material 290 may be driven between a minimum voltage and a maximum voltage. In one aspect of the present invention, the maximum voltage may be greater than a threshold voltage of the layer of liquid crystal material. In one aspect of the present invention, the minimum voltage may be substantially equal to the threshold voltage of the layer of liquid crystal material required to induce the aforementioned bend structure. In another aspect of the present invention, the layer of liquid crystal material 290 may have a first retardation value of $3\lambda/4$ in the presence of the applied minimum voltage and a second retardation value of $\lambda/4$ in the presence of the applied maximum voltage. The layer of liquid crystal material 290, the first orientation film 218, and the second orientation film 272 may constitute a bend cell having the aforementioned bend structure in the presence of an applied voltage greater than a threshold voltage of the layer of liquid crystal material 290. In one aspect of the present invention, the alignment direction of the first and second orientation films 218 and 272 may be substantially the same. In another aspect of the present invention, the first and second orientation films 218 and 272 may be rubbed along the same direction.

Referring now to FIG. 8A, non-polarized ambient light incident to the polarizing plate 282, may become linearly polarized light in correspondence with the polarization axis of the polarizing plate 282. Thus, linearly polarized light having a polarizing angle of about 0° may be transmitted by the polarizing plate 282 become incident to the layer of liquid crystal material 290. Since the layer of liquid crystal material 290 has the first retardation value of $3\lambda/4$ in the presence of the applied minimum voltage (i.e., $V=V_{min}$; the threshold voltage), the linearly polarized light having the polarizing angle of about 0° may be converted into right-handed circularly polarized light by the layer of liquid crystal material 290. Further, since the CCF layer 214 selectively reflects only left-handed circularly polarized light having a wavelength range corresponding to the color red, the right-handed circularly polarized light transmitted by the layer of liquid crystal material 290 may also be transmitted by the CCF layer 214 and be absorbed by a light absorption layer 212. Accordingly, the reflective LCD device may be maintained in a black state.

Referring now to FIG. 8B, non-polarized ambient light incident to the polarizing plate 282 may become linearly polarized light in correspondence with the polarization axis of the polarizing plate 282. Thus, linearly polarized light having a polarizing angle of about 0° may be transmitted by the polarizing plate 282 and become incident to the layer of liquid crystal material 290. Since the layer of liquid crystal material 290 has the second retardation value of $\lambda/4$ in the presence of the applied maximum voltage (i.e., $V=V_{max}$), the linearly polarized light having the polarizing angle of about 0° may be converted into left-handed circularly polarized light by the layer of liquid crystal material 290. Further, since the CCF layer 214 may reflect only left-handed circularly polarized light having a wavelength range corresponding to the color red, only the red left-handed circularly polarized light transmitted by the layer of liquid crystal material 290 may be reflected by the CCF layer 214. The reflected left-handed circularly polarized light having the wavelength corresponding to the color red may then be re-transmitted by the layer of liquid crystal material 290 where it may subsequently be converted into red linearly polarized light having a polarizing angle of about 0°. Since the red linearly polarized light having the polarizing angle of about 0° substantially corresponds with the polarization axis of the polarizing plate 282, the red linearly polarized light having the polarizing angle of about 0° may be transmitted by the polarizing plate 282. The optical driving principles described above with respect to red light are similarly applied to green and blue light. Accordingly, the reflective LCD device of the present invention may maintain a white state by combining the reflected red, green, and blue light.

In one aspect of the present invention, the aforementioned minimum voltage may be between about 0.1 V and about 1.5 V. In another aspect of the present invention, the maximum voltage may be between about 4.0 V and about 5.0 V. In yet another aspect of the present invention, the minimum and maximum voltages that may be applied to the layer of liquid crystal material 290 may vary according to specific parameters of the layer of liquid crystal material 290.

According to the principles of the present invention, the response time and viewing angle characteristics of the reflective LCD device shown in FIG. 6 may be improved compared to the aforementioned related art reflective LCD device shown in FIG. 1. Further, use of retardation films such as a broadband quarter wave plates (QWP) may be replaced using a layer of liquid crystal material having retardation values of $3\lambda/4$ and $\lambda/4$.

Figure 9:
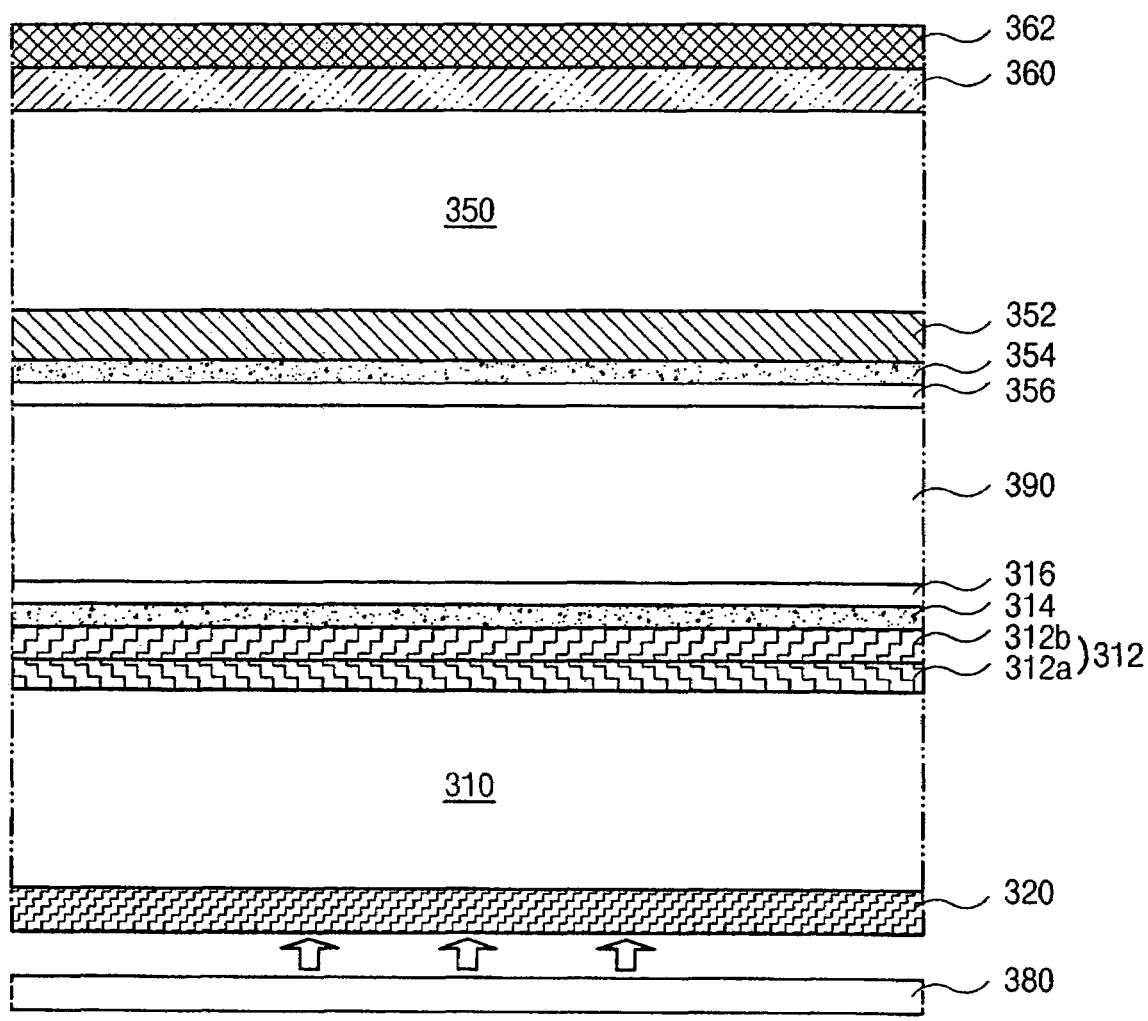
FIG. 9 illustrates a cross-sectional view of a transmissive liquid crystal display device incorporating a CCF layer in accordance with a second aspect of the present invention.

FIG. 9 illustrates a cross-sectional view of a transmissive liquid crystal display device incorporating a CCF layer in accordance with a second aspect of the present invention.

Referring to FIG. 9, first and second substrates 310 and 350, respectively, each may include inner surfaces facing and spaced apart from each other. A cholesteric liquid crystal color filter (CCF) layer 312 including first and second sub CCF layers 312a and 312b, respectively, may be formed on the inner surface of the first substrate 310. A first transparent electrode 314 may be formed on the CCF layer 312 and a first orientation film 316 may be formed on the first transparent electrode 314. A first polarizing plate 320 may be formed on an outer surface of the first substrate 310. An array element layer 352 may be formed on the inner surface of the second substrate 350 and a second transparent electrode 354 may be formed on the array element layer 352. A second orientation film 356 may be formed on the second transparent electrode 354. A compensating layer 360 may be formed on an outer surface of the second substrate 350 and a second polarizing plate 362 may be formed on the compensating layer 360. A backlight unit 380 may be disposed beneath the first polarizing plate 320. A layer of liquid crystal material 390 may be interposed between the first and second orientation films 316 and 356.

As similarly described above with respect to FIGS. 5 and 6, the layer of liquid crystal material 390, the first orientation film 316, and the second orientation film 356 may constitute a bend cell having a bend structure in the presence of an applied voltage greater than a threshold voltage of the layer of liquid crystal material 390. Further, the compensating layer 360 of the present invention differs from the retardation film 60 shown in FIG. 1 because the compensating layer 360 may be provided as a biaxial film having a simpler structure than the retardation film 60 shown in FIG. 1 and be fabricated according to a simpler process than that required to fabricate the retardation film 60. Further, the material cost of the compensating film may be substantially less than that of the retardation film. Accordingly, the compensating film may widen the viewing angle and improve the display quality of the LCD device shown in FIG. 9 whereas the retardation film 60 of FIG. 1 is provided as a broadband QWP that compensates a phase difference of incident light. Accordingly, retardation films such as those incorporated within the aforementioned related art LCD devices are not required by the LCD device of the present invention. In one aspect of the present invention, the compensating layer 360 maybe omitted by adjusting a parameter of the bend cell structure.

According to the second aspect of the present invention, the first polarizing plate 320 may be formed of a cholesteric liquid crystal (CLC) material capable of selectively reflecting only left-handed or right-handed circularly polarized light of all wavelengths. The CCF layer 312 may be provided as a material capable of selectively reflecting only left-handed or right-handed circularly polarized light having a predetermined wavelength range (i.e., color). According to the principles of the present invention, the first sub-CCF layer 312a may selectively reflect only left-handed or right-handed circularly polarized light having a wavelength range corresponding to one of red, green, and blue colors while the second sub-CCF layer 312b may selectively reflect only left-handed or right-handed circularly polarized light having a wavelength range corresponding to a different one of the red, green, and blue colors. For example, within a red sub-pixel region, the first sub-CCF layer 312a may selectively reflect only left-handed circularly polarized light having a wavelength corresponding the color green while the second sub-CCF layer 312b may selectively reflect only left-handed circularly polarized light having a wavelength corresponding to the color blue. Therefore, within the red sub-pixel region, only left-handed circularly polarized light having a wavelength corresponding to the color red may be transmitted by the CCF layer 312.

According to the principles of the present invention, the layer of liquid crystal material 390 may be driven between a minimum voltage and a maximum voltage. In one aspect of the present invention, the maximum voltage may be greater than a threshold voltage of the layer of liquid crystal material. In one aspect of the present invention, the minimum voltage may be substantially equal to the threshold voltage of the layer of liquid crystal material required to induce the aforementioned bend structure. In another aspect of the present invention, the layer of liquid crystal material 390 may have a first retardation value of $3\lambda/4$ in the presence of the applied minimum voltage and a second retardation value of $\lambda/4$ in the presence of the applied maximum voltage. Accordingly, retardation films such as those incorporated within the aforementioned related art LCD devices are not required by the LCD device of the present invention.

Figure 10A:
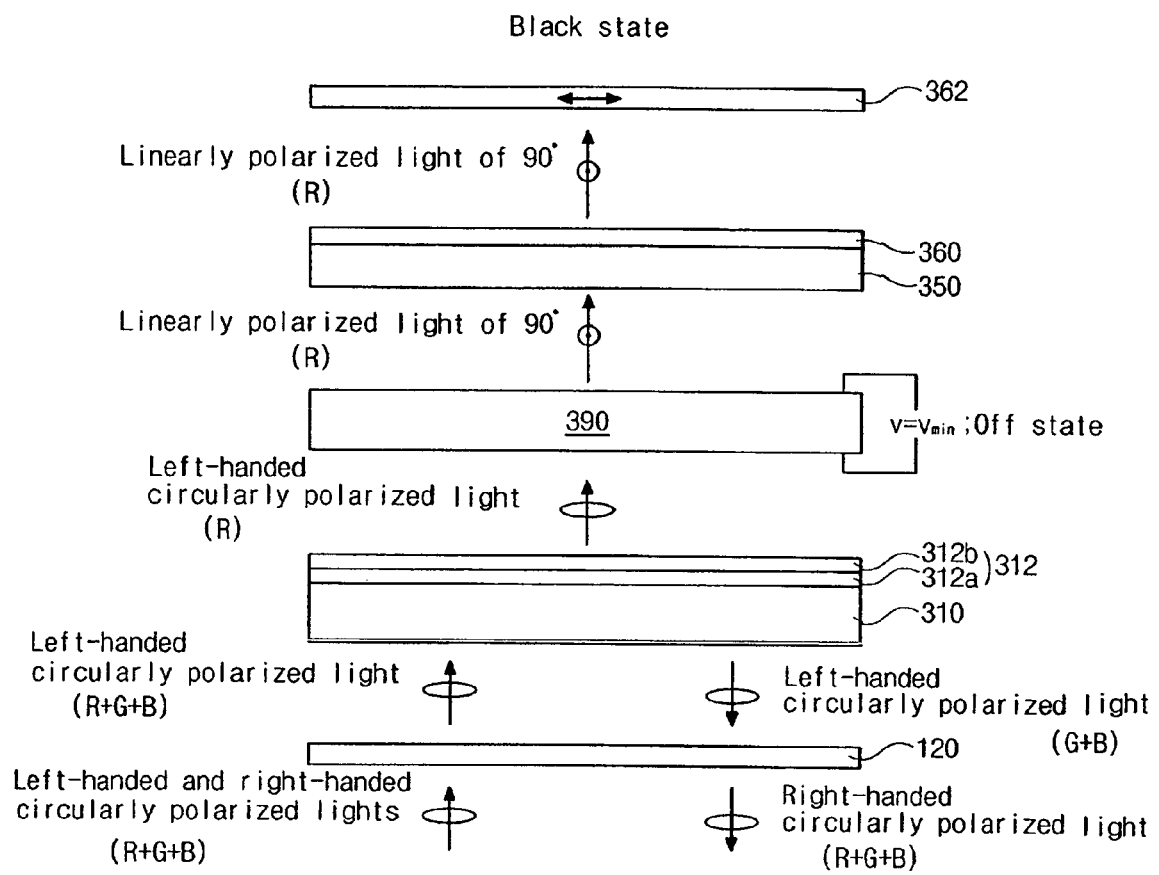
FIG. 10A schematically illustrates optical driving principles of a transmissive liquid crystal display device shown in FIG. 9 in the presence of a minimum voltage applied to a layer of liquid crystal material.
Figure 10B:
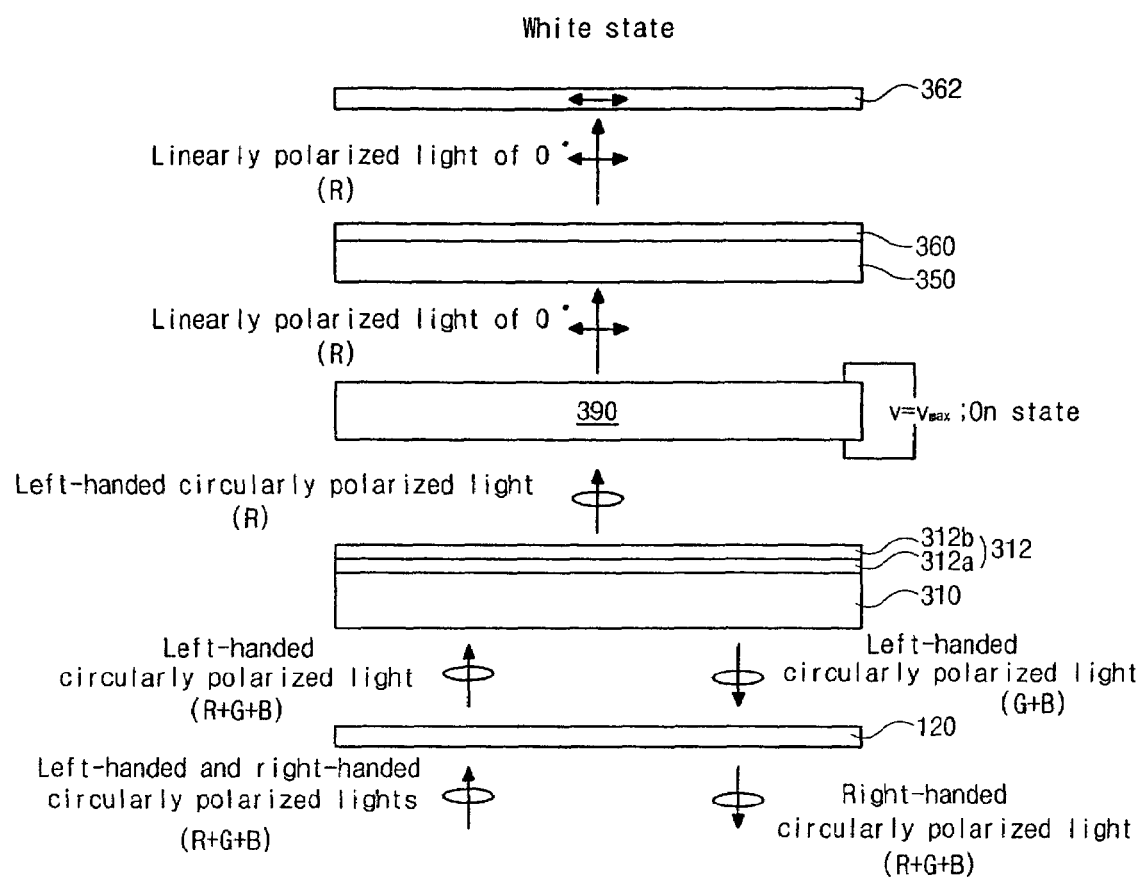
FIG. 10B schematically illustrates optical driving principles of a transmissive liquid crystal display device shown in FIG. 9 in the presence of a maximum voltage applied to a layer of liquid crystal material.

FIG. 10A schematically illustrates optical driving principles of a transmissive liquid crystal display device incorporating a CCF layer in the presence of a minimum voltage applied to a layer of liquid crystal material, and FIG. 10B schematically illustrates optical driving principles of a transmissive liquid crystal display device incorporating a CCF layer in the presence of a maximum voltage applied to a layer of liquid crystal material.

For convenience of illustration, the transmissive LCD device shown in FIGS. 10A and 10B may function in a normally black mode (i.e., a black image may be displayed in the presence of an applied minimum voltage). Further, for convenience of illustration, only a red sub-pixel region is shown in FIGS. 10A and 10B. It will be readily appreciated, however, that the optical driving principles described below may be similarly applied, for example, to green and blue sub-pixel regions as well.

Referring to 10A and 10B, the first polarizing plate 320 may be provided as a cholesteric liquid crystal (CLC) material that selectively reflects only right-handed circularly polarized light for all wavelengths. The compensating layer 360 may be provided as a biaxial film for widening a viewing angle and improving a display quality of the transmissive LCD device incorporating the cholesteric liquid crystal color filter (CCF) layer 312. According to the principles of the present invention, the compensating layer 360 may not change the phase of light and may be omitted by adjusting a parameter of the bend cell. The cholesteric liquid crystal color filter (CCF) layer 312 may, for example, include first and second sub-CCF layers 312a and 312b, respectively, for reflecting only left-handed circularly polarized light having wavelengths corresponding to green and blue colors, respectively. The layer of liquid crystal material 390 may be provided to exhibit a bend structure in the presence of an applied voltage greater than a threshold voltage. In one aspect of the present invention, the layer of liquid crystal material 390 may be driven between a minimum voltage and a maximum voltage. In one aspect of the present invention, the maximum voltage may be greater than a threshold voltage of the layer of liquid crystal material. In one aspect of the present invention, the minimum voltage may be substantially equal to the threshold voltage of the layer of liquid crystal material required to induce the aforementioned bend structure. In another aspect of the present invention, the layer of liquid crystal material 390 may have a first retardation value of 3λ/4 in the presence of the applied minimum voltage and a second retardation value of λ/4 in the presence of the applied maximum voltage. The second polarizing plate 362 may be provided as a linear polarizer having a polarization axis of about 0°.

Referring now to FIG. 10A, of the non-polarized light emitted by the backlight unit 380 and incident to the first polarizing plate 320, right-handed circularly polarized light may be selectively reflected such and only left-handed circularly polarized light of all wavelengths may be transmitted by the first polarizing plate 320. The CCF layer 312, including the first and second sub CCF layers 312a and 312b, then may selectively reflect only the incident left-handed circularly polarized light having wavelength ranges corresponding to green and blue colors. Accordingly, only left-handed circularly polarized light having a wavelength range corresponding to the color red may be transmitted by the CCF layer 312. Since the layer of liquid crystal material 390 has the first retardation value of 3λ/4 in the presence of the applied minimum voltage (i.e., $V=V_{min}$; the threshold voltage), the left-handed circularly polarized light having the wavelength range corresponding to the color red may be converted into red linearly polarized light having a polarizing angle of about 90° via the layer of liquid crystal material 390. Further, since the second polarizing plate 362 may be provided as a linear polarizer having a polarization axis of about 0°, the red linearly polarized light having the polarizing angle of about 90° may not be transmitted by the second polarizing plate 362. Accordingly, the transmissive LCD device may be maintained in a black state.

Referring now to FIG. 10B, of the non-polarized light emitted by the backlight unit 380 and incident to the first polarizing plate 320, right-handed circularly polarized light of all wavelengths may be selectively reflected and only left-handed circularly polarized light of all wavelengths may be transmitted by the first polarizing plate 320. The CCF layer 312, including the first and second sub CCF layers 312a and 312b, may then selectively reflect the incident left-handed circularly polarized light having wavelength ranges corresponding to green and blue colors. Accordingly, only left-handed circularly polarized light having a wavelength range corresponding to the color red may be transmitted by the CCF layer 312. Since the layer of liquid crystal material 390 has the second retardation value of λ/4 in the presence of the applied maximum voltage (i.e., $V=V_{max}$), the liquid crystal layer 390 may convert the left-handed circularly polarized light transmitted by the CCF layer 312 into red linearly polarized light having a polarizing angle of about 0°. Further, since the second polarizing plate 362 is provided as a linear polarizer having a polarization axis of about 0°, red linearly polarized light having the polarizing angle of about 0° may be transmitted by the second polarizing plate 362. The optical driving principles described above with respect to red light may be similarly applied to wavelengths of light corresponding to green and blue colors, or other colors. Accordingly, the transmissive LCD device of the present invention may maintain a white state by combining the reflected red, green, and blue light.

The reflective and transmissive LCD devices of the present invention may incorporate a layer of liquid crystal material having retardation values substantially identical to those of related art broadband QWP retardation plates (e.g., 3λ/4 and λ/4). Accordingly, the LCD devices of the present invention may maintain black and white states without the use of the aforementioned related broadband QWP retardation films. Since such related art retardation films are not used, problems related to device reliability due to shrinkage and distortion of retardation films may be avoided. Moreover, response time and viewing angle characteristics of the LCD device of the present invention may be improved over the aforementioned related art LCD devices.

It will be apparent to those skilled in the art that various modifications and variations can be made in the method of manufacturing a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first substrate having an inner surface.

2. A liquid crystal display device, comprising:
   first substrate having an inner surface;
   second substrate having an inner surface, wherein the inner surface of the second substrate faces and is spaced apart from the inner surface of the first substrate;
   a first polarizing plate arranged on an outer surface of the first substrate;
   a cholesteric liquid crystal color filter (CCF) layer arranged on the inner surface of the first substrate, wherein the CCF layer selectively transmits light having a wavelength range corresponding to one of red, green, and blue colors;
   a first transparent electrode arranged directly on the CCF layer;
   a first orientation film arranged on the first transparent electrode;
   a second transparent electrode arranged on the inner surface of the second substrate;
   a second orientation film arranged on the second transparent electrode, wherein the first and second orientation films have substantially the same orientation directions;
   a second polarizing plate arranged on an outer surface of the second substrate;
   a layer of liquid crystal material arranged between the first and second orientation films,
   wherein the layer of liquid crystal material includes a plurality of liquid crystal molecules having a substantially symmetrical orientation about a mid-point between the first and second orientation films,
   wherein the layer of liquid crystal material functions in an optically compensated birefringence (OCB) mode and the plurality of liquid crystal molecules have the substantially symmetrical orientation in the presence of a voltage applied to the layer of liquid crystal material,
   wherein the applied voltage is between a minimum voltage and a maximum voltage, and
   wherein the layer of liquid crystal material has a retardation value of 3 λ/4 when the applied voltage is substantially equal to the minimum voltage; and
   a backlight unit arranged under the first polarizing plate.

3. The device according to claim 2, wherein the first polarizing plate includes cholesteric liquid crystal (CLC) material for selectively reflecting one of left-handed and right-handed circularly polarized light of all wavelengths.

4. The device according to claim 2, wherein the second polarizing plate includes a linear polarizer.

5. The device according to claim 2, further comprising:
   an array element layer arranged over the inner surface of the second substrate, wherein the array element layer includes:

a gate line;

a data line crossing the gate line; and thin film transistor connected to the gate line and the data line.

6. The device according to claim 5, wherein the array element layer is arranged between the inner surface of the second substrate and the second transparent electrode.

7. The device according to claim 2, further comprising a compensating film arranged between the outer surface of the second substrate and the second polarizing plate.

8. The device according to claim 2, wherein the maximum voltage is greater than a threshold voltage of the layer of liquid crystal material.

second substrate having an inner surface, wherein the inner surface of the second substrate faces and is spaced apart from the inner surface of the first substrate;

a first polarizing plate arranged on an outer surface of the first substrate;

a cholesteric liquid crystal color filter (CCF) layer arranged on the inner surface of the first substrate, wherein the CCF layer selectively transmits light having a wavelength range corresponding to one of red, green, and blue colors;

a first transparent electrode arranged directly on the CCF layer;

a first orientation film arranged on the first transparent electrode;

a second transparent electrode arranged on the inner surface of the second substrate;

a second orientation film arranged on the second transparent electrode, wherein the first and second orientation films have substantially the same orientation directions;

a second polarizing plate arranged on an outer surface of the second substrate;

a layer of liquid crystal material arranged between the first and second orientation films, wherein the layer of liquid crystal material includes a plurality of liquid crystal molecules having a substantially symmetrical orientation about a mid-point between the first and second orientation films, wherein the layer of liquid crystal material functions in an optically compensated birefringence (OCB) mode and the plurality of liquid crystal molecules have the substantially symmetrical orientation in the presence of a voltage applied to the layer of liquid crystal material, wherein the applied voltage is between a minimum voltage and a maximum voltage, and wherein the layer of liquid crystal material has a retardation value of $\lambda/4$ when the applied voltage is substantially equal to the maximum voltage; and a backlight unit arranged under the first polarizing plate.

9. The device according to claim 2, wherein the minimum voltage is substantially equal to a threshold voltage of the layer of liquid crystal material.

10. The device according to claim 2, wherein the minimum voltage is between about 1.0 V and about 1.5 V.

11. The device according to claim 2, wherein the maximum voltage is between about 4.0 V and about 5.0 V.

12. The device according to claim 2, wherein the CCF layer includes:

a first sub-CCF layer for selectively reflecting light having a wavelength range corresponding to one of a red, green, or blue color; and a second sub-CCF layer for selectively reflecting light having a wavelength range corresponding to another one of a red, green, or blue color, different from the color selectively reflected by the first sub-CCF layer.

13. The device according to claim 2, wherein the first transparent electrode includes a common electrode.

14. The device according to claim 2, wherein the second transparent electrode includes a pixel electrode.

* * * * *